(12) United States Patent
Kozlay

(10) Patent No.: US 8,103,402 B2
(45) Date of Patent: Jan. 24, 2012

(54) APPARATUS, METHOD AND SYSTEM FOR ENFORCING VEHICLE OPERATOR POLICY COMPLIANCE

(76) Inventor: Douglas Everett Kozlay, Timonium, MD (US)

( * ) Notice: Subject to any disclaimer, the term of this patent is extended or adjusted under 35 U.S.C. 154(b) by 0 days.

(21) Appl. No.: 12/806,362

(22) Filed: Aug. 11, 2010

(65) Prior Publication Data

US 2011/0046845 A1 Feb. 24, 2011

Related U.S. Application Data

(60) Provisional application No. 61/274,302, filed on Aug. 14, 2009.

(51) Int. Cl.
*G06F 7/00* (2006.01)
(52) U.S. Cl. ............................................ 701/33; 701/36
(58) Field of Classification Search .................. 701/33, 701/36; 342/386; 340/870.18; 455/3.01; 713/155, 176, 186
See application file for complete search history.

(56) References Cited

U.S. PATENT DOCUMENTS

| | | |
|---|---|---|
| 6,219,793 B1 | 4/2001 | Li |
| 6,456,822 B1 | 9/2002 | Gofman |
| 6,606,562 B1 | 8/2003 | Gifford |
| 6,978,146 B1 | 12/2005 | Yardman |
| 7,505,730 B2 | 3/2009 | Huang |

*Primary Examiner* — Gertrude Arthur Jeanglaude

(57) ABSTRACT

Apparatus, method, and system enforce compliance with Transportation Safety Policies (TSP) governing vehicle fleets, subways, trains, busses, airplanes, etc.

The apparatus identifies, authenticates, authorizes and logs-in all drivers/operators before enabling vehicle operation. Assigned privileges are granted to Transportation Safety System (TSS) enrolled drivers/operators. After drivers/operators log-in, the apparatus detects, reports, and alarms safety violations to the governing TSS. Biometric log-in precludes driver/operator repudiation.

In preferred embodiments, biometric readers and/or card-based fingerprint readers are mounted into vehicle dashboards for driver/operator authentication/log-in.

The invention helps reduce inattentiveness accidents due to unauthorized wireless use (phoning, texting, Internet, games, etc.). Unauthorized wireless usage by drivers/operators is detected in driving and control areas. All unauthorized activity is logged, alarmed and/or reported to Transportation Safety System administrators, depending on incident type, severity, and/or safety violation.

Remediation action varies from issuing warnings, to logging violations, to incapacitating vehicles forcing safety stops requiring supervisory intervention.

50 Claims, 5 Drawing Sheets

Typical Location and Communications of TSP Unit in a Train

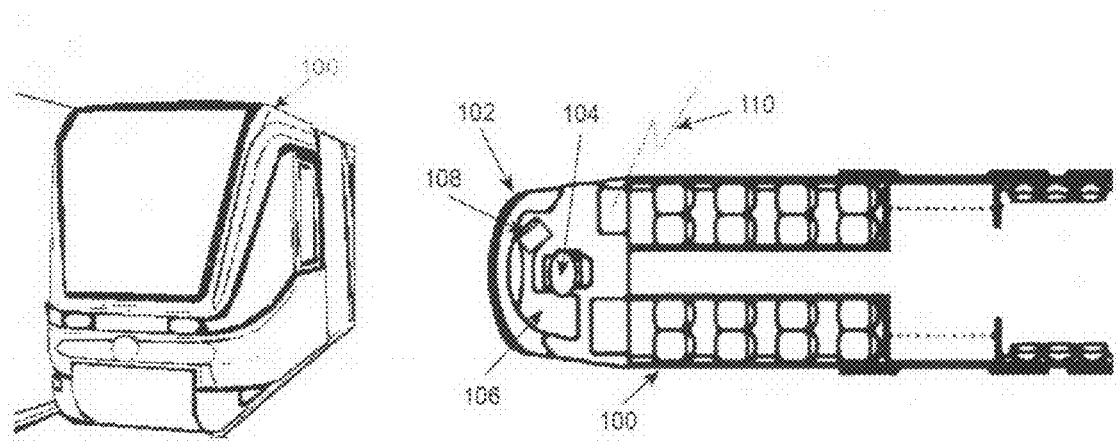
Figure 1: Typical Location and Communications of TSP Unit in a Train
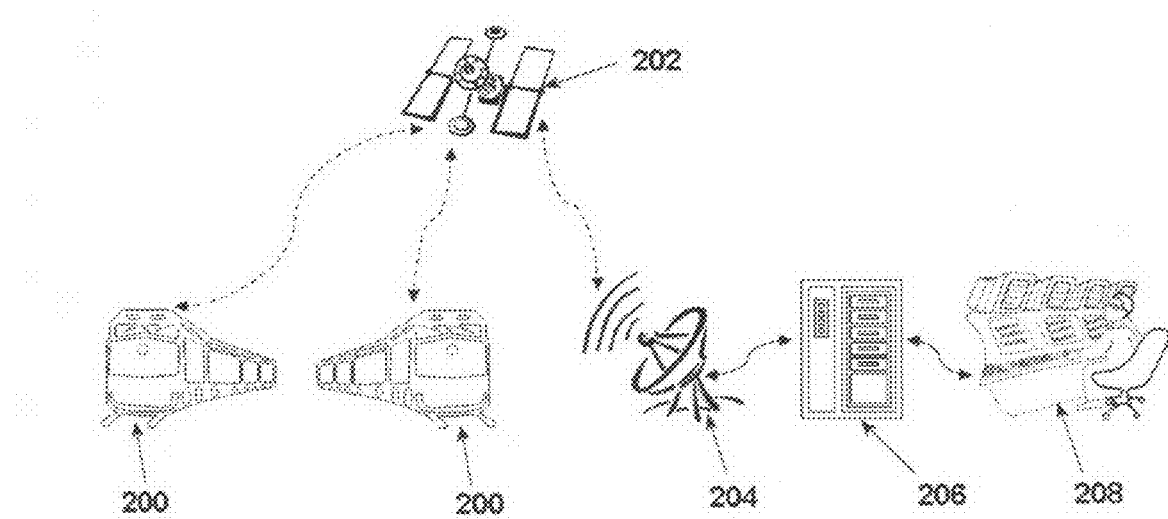
Figure 2: TSP System Overview

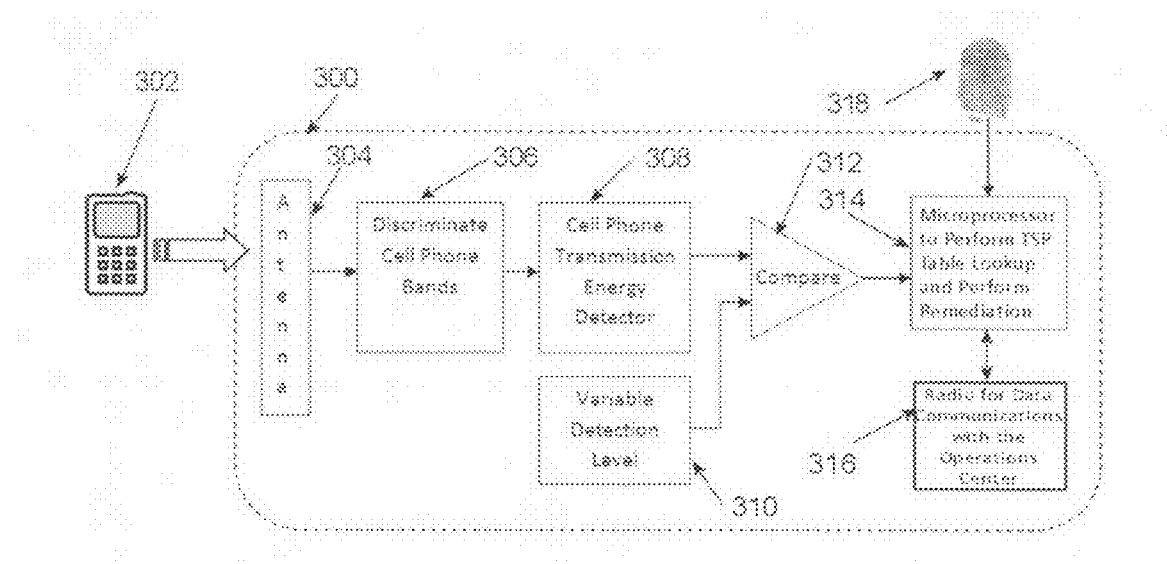
Figure 3: Cell Phone Transmission Energy Detector
Figure 4: Example of a Remediation Table as part of a Transportation Safety Profile

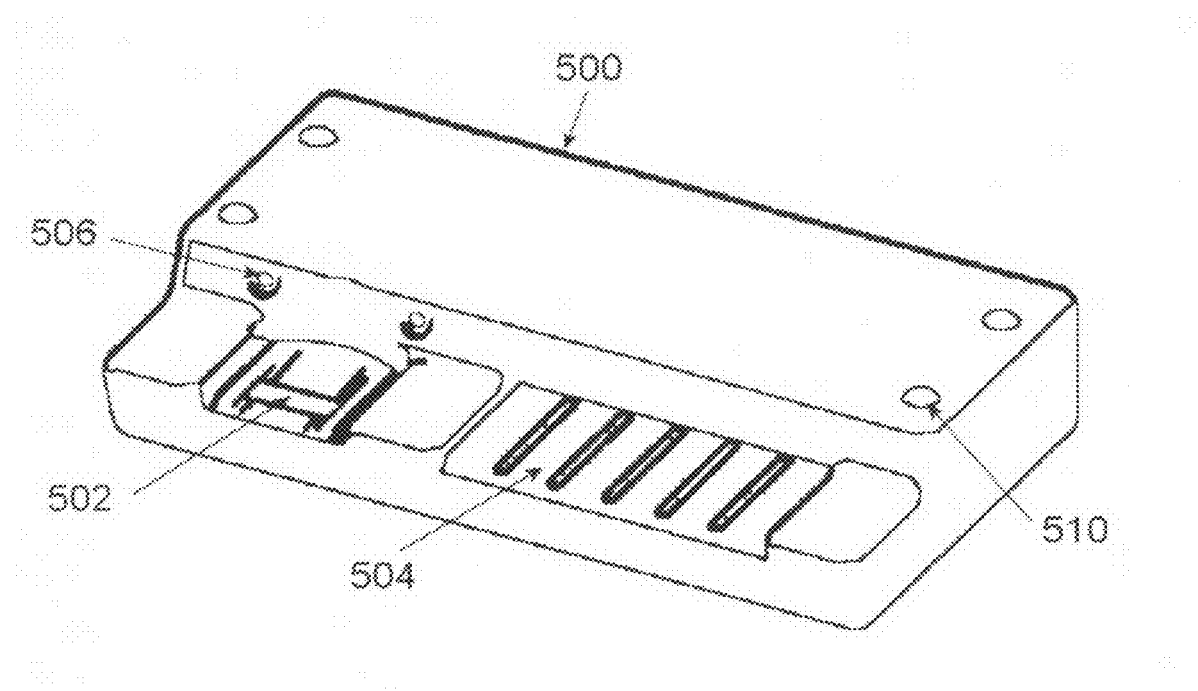
Figure 5: Device for Biometric Authentication of Driver Identity (bolted on dashboard)
(Version 1: Transportation Safety Apparatus w/ Fingerprint Swipe Sensor & Smartcard Port)

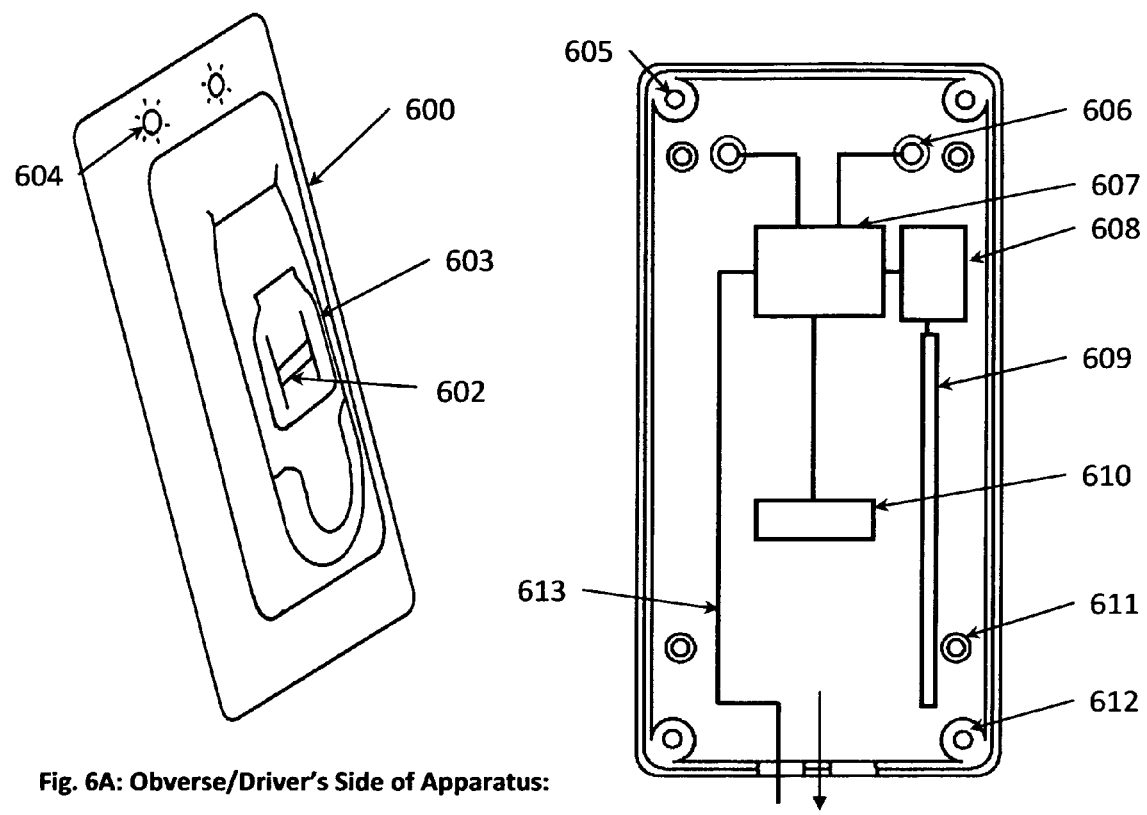
Fig. 6A: Obverse/Driver's Side of Apparatus:
(Version 2 w/inserted Fingerprint ID device)
Fig. 6B: Reverse/Windshield or Dashboard Side →
(Version 2, Circuit Subsystem Block Diagram)

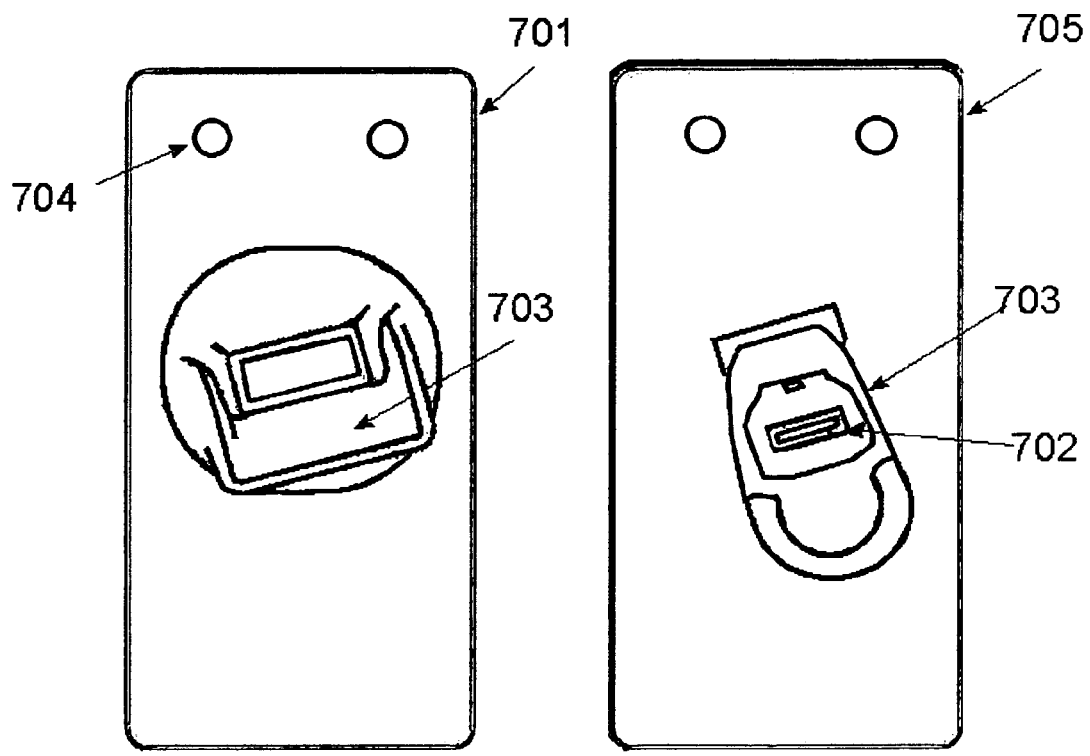
Fig. 7A: Faces Driver, no FID inserted (left);     Fig. 7B: with FID inserted in 703 (right)
(Version 2, adapted for installation on or next to vehicle windshield)

APPARATUS, METHOD AND SYSTEM FOR ENFORCING VEHICLE OPERATOR POLICY COMPLIANCE

CROSS REFERENCE TO RELATED & AUXILIARY APPLICATIONS

This Regular Patent Application claims priority to earlier-filed U.S. Provisional Patent Application No. 61/274,302 filed by inventor Douglas Kozlay on Aug. 14, 2009 which is hereby incorporated in its entirety by reference herein. Additionally, this Regular Patent Application discusses use of an alternative biometric interface device (see discussion of FIGS. 6A, 6B, 7A, 7B) as an auxiliary interface device: that device is already patented in U.S. Pat. No. 7,480,637 to Douglas Kozlay (the same inventor, undersigned). Accordingly, to better enable the present invention, my U.S. Pat. No. 7,480,637 is also incorporated in its entirety by reference herein.

APPLICATION TERMINOLOGY

For the purpose of this application, "emission" is defined as "wireless communication signals", i.e., broadcast signals typically emitted from cell phones, texting devices, internet devices, wireless PDA's and PC's, and the like. Accordingly, the term "emission anomalies", defines as "unauthorized wireless communication signals", i.e., wireless broadcast signals that aren't permissible by predefined policy. In turn, the term "Transportation Safety Policies", or "TSP", are defined as "governing or mandated wireless radio frequency (RF) spectrum emission rules". These comprise limitations and/or restrictions (imposed, promulgated or legislated) by relevant authorities or jurisdictions on transmission of wireless signals by users of electronic devices. Transportation Safety Policies (TSPs) can also specify affirmative or negative emission privileges. Such "policies" are usually rules and regulations of public regulators, security administrators, supervisors, and/or owners of transportation fleets.

The term "Transportation Safety System", or "TSS", is defined as integrated hardware, software, communications, and network resources and components comprising one or more computers, software, databases, transceivers, network interfaces and connections, fallback procedures, and the like. Such a system comprises a networked database monitoring system, usually operated by an applicable authority or authorities, or a facility manager(s). A Transportation Safety System (TSS) can be centralized and/or distributed.

The TSS is generally the system or systems by which an enforcement authority monitors and detects transmission detection operations of (one or more) locally-deployed Transportation Safety Apparatus ("TSA") device(s) installed in each equipped vehicle which is being (or is to be) monitored or operationally accounted for, with or without a driver and/or a vehicle operator "logged-in"/i.e., "on duty", "logged-out"/ "off duty", where the vehicle is either deployed or not deployed as applicable.

The terms "biometric" or "biometrics" or "biometric modality" can mean any implemented biometric user authentication device. Here, the fingerprint sensor biometrics device is used as one best mode of the invention. Notwithstanding, there are many other biometric devices and modalities which could be adapted to operate as authentication mechanisms with the present invention where practicable or required, including (but not limited to) a hand geometry sensor, a face recognition sensor, a heartbeat sensor, a breathalyzer sensor, and/or a voiceprint.

The terms "data" "operations data", "exception data", "alarm data", "event data", "emission data", "data count", and the like, can refer to any number of types of reportable data related to the operation of a vehicle or its operational status. Such data could also include (but is not limited to) fuel level, fuel consumption rate, time to fuel empty, vehicle geographic location, engine or motor readings including voltage, current, charge-level of batteries, speed, acceleration, braking, underway time data, "logged in" operator or driver data, etc.

The term "wireless electronic device" can be used to designate cellular telephones, Personal Data Apparatus (PDA), Blackberry devices, Internet games devices, iPhones, iPads, wireless transmitters of many different types, including beacon devices, surveillance devices, etc.

The terms "monitoring and detecting" means the detection of wireless device transmissions in vicinity of the present invention. Wireless events detectable include (but are not limited to) all predetermined frequencies, spectrum emissions, radio waves; anomalous events, including operating conditions, emitted frequencies above, below, or at specified power levels, emitted at certain times or conditions, etc. System operator(s), who create one or more Transportation Safety Policies, Transportation Safety System(s) and who operate, own, secure, and/or manage a vehicle or fleet(s) of vehicles, specify exactly what is "monitored and detected", reported, alarmed, alerted, and/or logged and transmitted to external or internal systems. Events reported to the Transportation Safety System can include details of vehicle operation (e.g., logged in status, logged in underway, logged in underway but not making way, braking, accelerating, starting, stopping, etc.).

"Public transportation", "public safety", "common carriage", and "police, fire, and first responders" refer to public-impact and public-sector vehicular applications. Here, lives of many people are at stake: when multi-person public or private vehicles (auto, bus, train, subway, etc.)—or public-safety vehicles (police, fire, ambulance, etc.)—are not properly operated and/or if a vehicle is not properly maintained, trouble often results. Recent current events are replete with disastrous auto, train, and subway crashes. These are often caused when inattentive, negligent, or abusive driver(s), engineer(s), or operator(s) are not properly paying attention to their jobs and/or improperly controlling operation of their vehicle(s).

FIELD OF THE INVENTION

The field of the invention is transportation safety. More particularly, the field relates to: (1) biometric (or other) identification, authentication, and "log-in" of enrolled drivers and vehicle operators; (2) the monitoring of "logged-in" driver and operator wireless activity to ensure their wireless (RF spectrum) emissions comply with one or more applicable or mandated Transportation Safety Policies ("TSP"); (3) enabling operation of governed vehicles so long as drivers and operators comply with TSPs; and (4) logging, reporting, alarming and remediating at any time necessary and/or as predetermined, whenever unauthorized emissions are detected.

More particularly, the invention finds excellent applications when deployed with vehicles engaged in public transportation, public safety, common carriage, police or fire, and/or public rental or lease applications. Ideally, where public transportation is concerned, it can be helpful to reduce risk and provide monitoring systems, apparatuses, methods, and modalities to better ensure that drivers and/or operators, certain passengers, and certain automobile, truck, bus, subway and train operators obey restrictions on wireless emissions while "on-duty".

OBJECTS OF THE INVENTION

It is a primary object of the invention, to promote transportation safety.

It is another primary object of the invention, to establish and promulgate at least one or more Transportation Safety Policies (TSP) to promote and ensure driver and/or vehicle operator compliance with safety rules associated with "on-duty" wireless emission restrictions, emission privileges, or emission preemptions or proscriptions. Transportation Safety Policies applying to "on-duty" wireless use can originate from public sector regulators (e.g., police, FCC, local, state, and/or federal governments), and/or from commercial sector regulators (company executives, administrators, security forces, etc.). "Sanctions" can be applied when policies are violated, (based on the gravity of emission transgression).

It is a related object of the invention, to monitor, detect, log, report, trigger alarms and/or encourage remediation procedures, whenever RF spectrum emissions within a predefined vicinity of authenticated and "logged-in" drivers, particularly those operating in service and in positions of trust (e.g., when human life or great monetary values are at stake). This especially applies when drivers or operators are "on-duty" in common carriage, or serving aboard public conveyances wherever people are and/or wherever valuable or dangerous cargo is transported.

It is another related object, to monitor RF spectrum emissions and detect and report "RF spectrum emission anomalies" (i.e., TSP violations and/or unauthorized emissions) of wireless devices in the immediate vicinity, work area, or within a predefined proximity of authenticated drivers and/or vehicle operators in commercial transportation service, or wherever RF emissions must either be restricted, limited to emergencies, and/or where radio silence, radio interference, and/or radio minimization needs require partial or total ban on emissions.

Yet another related object is to provide for initiation of mitigation or remediation procedures when spectrum emission anomalies are detected, if they are sufficiently serious to require same. A directly-related object is to provide a TSP framework for evaluating and classifying all spectrum emission anomalies for the purpose of record-keeping and for determining reporting, alarming, and escalation priorities.

It is another related object to provide a real-time monitoring function which will assist enforcement of rules associated with wireless device usage while a vehicle is underway and making way under control by at least one of an authorized driver and/or operator.

SUMMARY AND OVERVIEW OF THE STATE OF THE ART

Inventions disclosed are typically deployed in managed fleet vehicles and/or single vehicles, for communication with Transportation Safety Systems (TSS) (monitoring equipment and personnel) administrating, supervising, or governing vehicle usage. The Transportation Safety Apparatus (TSA) devices are locally deployed in managed vehicle(s), and communicate to the TSS managed and operated monitored by the local and/or regional governing authority, according to local and/or regional Transportation Safety Policies (TSP). Transportation Safety Policies (TSP) are usually in force for many drivers of trains, busses, subways, trucks, car, and other public or monitored transportation applications.

Promoting transportation safety is a popular marketplace issue. Many products now address various aspects of transportation safety. Accordingly, the overarching primary object of the present invention is to promote transportation safety. More particularly, the apparatus of the present invention promotes transportation safety by monitoring and detecting RF spectrum emissions in the immediate vicinity of vehicle operators, and reports such emissions to a local onboard database and/or to one or more Transportation Safety Systems (TSS) in accordance with dictates of the local and applicable rules and regulations of one or more Transportation Safety Policies (TSPs).

The present invention is implemented most effectively and provides greatest benefits in large-scale managed vehicle management systems, where conduct of vehicle operators must comply with certain policies, rules, and limitations of a predefined TSP (e.g., restricting or banning cell phones, emailing, texting, and/or other wireless device usage in a driver's and/or vehicle operator's immediate vicinity) enforceable locally and/or by a Transportation Safety System.

Unsurprisingly, various features of the present invention are in the marketplace now (e.g., computers, security systems, ID systems using one or more biometric modalities, alarm systems, etc.). There are diverse transportation safety products now in the marketplace (e.g., engine speed governors) that restrict operator driving speed, as well as more sophisticated systems that detect location of the driver or operator and report the vicinity of the vehicle to administrators and security personnel that monitor the progress of their vehicles and/or the speed of their commercial vehicular activity. There are also other systems that monitor other status data via satellite or other telecommunications mechanisms.

In a semantic sense, "transportation safety" is a broad topic, but typical safety issues relate to controlling driving speed; the need to be aware of vehicles or persons immediately proximate to a driver/operator, (e.g., via onboard reverse-looking cameras); locks and keys to protect property by discouraging vehicle theft or peril, (e.g., Lo-Jack™, OnStar™, The Club™); providing personal ID biometrics via biometric ID systems; reporting of vehicle maintenance status via dashboard functions and/or alarms indicating vehicle events; etc.; "Breathalyzer™ and/or comparable systems (e.g., connected to the ignition for sobriety check); to mention a few.

Notwithstanding diverse transportation safety products already on the market that address diverse issues and needs, there appears to be no product on the market that monitors and detects RF spectrum emitted from the immediate vicinity of vehicle operators (e.g., cellphones, texting, email, and other wireless signals) and alarms and reports predefined exception conditions ("spectrum emission anomalies") to a remediation system.

Accordingly, the present invention is disclosed herein. The invention is adapted for monitoring and detecting wireless spectrum emissions from vehicle operator control cars, the caboose, a locomotive engine, etc. The invention detects spectrum emissions and emission anomalies (unauthorized wireless transmissions) and reports to administrators, system managers, etc., via an alarming and reporting interface, to an oversight system, i.e., one or more Transportation Safety System(s) operating under one or more Transportation Safety Policies (TSP).

OTHER TRANSPORTATION SAFETY PRODUCTS KNOWN IN THE ART

U.S. Pat. No. 6,978,146 to Yardman appears to show a cell phone blocking device that precludes cell usage, due to transmission of a blocking signal. While this may be effective for eliminating cell usage for some applications, it is not optimal for creating a TSP enforcement system which monitors, detects, reports and alarms detected RF emissions. By contrast, the present invention can be unobtrusively engaged in monitoring and detecting RF emissions, without partially or totally blocking emissions. A product such as Yardman's could also be subjected to FCC scrutiny for blocking communications (absent FCC waivers).

U.S. Pat. No. 6,606,562 to Gifford discloses a self-monitoring vehicle alert and tracking device system and associated methods. This device appears to be a security and tracking system for monitoring the location and status of vehicles. The invention can estimate geographic location of a vehicle and the time period in which the vehicle is operated. If the vehicle is being operated out of a specified geographic range or a specified time period, then the system provides alerts to users thereof. If the system has been tampered with or its power source is low, then a signal can be sent to a home base unit, which is used to monitor or track the vehicle, indicating the appropriate condition.

U.S. Pat. No. 6,456,822 to Gofman shows another cell phone blocking device for preventing cell calls, within a given area. The invention blocks the control frequencies of the cell system within a given area. The invention broadcasts a blocking signal with a low power output to interfere with reception ability, signal decoding, and broadcasting. This prevents the handshake routine between the cell system and the cell subscriber within the local cellular system.

Again, like Yardman patent (above), the product may be useful but it takes a brute force technical approach, unlike the more flexible/less intrusive approach of the present invention.

U.S. Pat. No. 7,505,730 to Huang also disconnects communication between cell phones and cell tower within a certain range. This invention automatically turns off the jammer when there is an emergency in the area, but allows jamming to resume normally after the emergency is over. The present invention, however, appears to offer more options and flexibility, since it monitors, detects, and reports and/or alarms a predefined TSP enforcement system of RF activity and RF emission privileges, without destruction of any telephone call.

From the Authentication Perspective

Looking at transportation safety challenges from the perspective of inventions relating to cell phones and relating to operator and/or cell phone authentication, we find several patents which disclose authentication of a user, or a transmission, or a cell phone itself (or the invention fails to authenticate and fails to make a connection).

U.S. Pat. No. 6,219,793 to Li uses fingerprints to authenticate wireless communications. The user's fingerprint acts as a secret key in the context of a modified "challenge-response"-oriented security interface approach.

The system includes fingerprint capture on the wireless cell and a central authentication system coupled to a conventional mobile switching center. When a wireless communication is to be initiated, the central authentication system engages in a challenge-response authentication through the common air interface. Authentication succeeds when user fingerprint authentication matches information from the central authentication system, and only calls placed from authorized users are connected. This invention may be useful in its preferred embodiments and in its targeted applications, however, it makes no provision for monitoring and detecting RF emissions for the purpose of ensuring that authenticated operators are complying with TSP-mandated restrictions (e.g., RF emissions restrictions or limitations). Authentication in the present invention is not only for ID purposes, but also to startup monitoring/detection "system-wide", ensuring operators comply with TSP.

Although other patent applications in the art may have combined one or more of the foregoing features, preliminarily, it appears there is no disclosure of a wireless authentication device for biometrically authenticating vehicle operators and for monitoring and detecting RF emissions in the immediate area of the vehicle driver/operator.

BRIEF SUMMARY OF THE PRESENT INVENTION

The invention disclosed provides an Transportation Safety apparatus (TSA), a Transportation Safety method, and the integrated Transportation Safety System (TSS) to ensure non-repudiation of driver and vehicle operator identification, authentication, and authorization by biometric or other reliable means; to ensure continuous compliance with spectrum emission restrictions of predetermined Transportation Safety Policies (TSP) by monitoring and detecting emissions of logged-in, "on-duty" drivers; to provide transmission of exception data and control information between and among said apparatus and at least one Transportation Safety System (TSS); and a TSS remediation procedure. Accordingly, drivers and affected operators are encouraged to refrain from unauthorized wireless spectrum emissions while "on duty" to promote safety. For the purposes of this application, "unauthorized emissions" involve transmitting and receiving cellphone signals, and wirelessly emailing, texting, and emissions that are restricted by Transportation Safety Policies (TSP).

The apparatus, method, and system of the invention allows vehicle operations management and/or security and administrative personnel, to ensure and enforce that drivers and vehicle operators comply with "on-duty" emission restrictions for vehicle operators as predefined in local Transportation Safety Policies (TSP) and as enforced by a TSP enforcement system.

The safety apparatus (TSA) of the present invention, using the method of the invention, reports detected RF spectrum emissions to the safety system (TSS) of the invention. Effectively, the TSA apparatus, via the method, reports RF spectrum emissions to a TSS database, and also reports certain predefined types of spectrum emissions (aka, "spectrum emission anomalies") not complying with TSP, via an alarming and reporting circuit that further reports to a TSS-based or locally-based remediating function. All are governed and managed by a central and/or distributed vehicle and vehicle operator TSS management system, all operating under the governance of the "Transportation Safety Policies" authority (TSP governance system).

The present invention is particularly suited for ensuring vehicle operator compliance with local transportation safety policies (TSP) as customized, installed and deployed in a defined TSP application area (one or more individually-defined TSP areas).

DESCRIPTION OF FIGURES & REFERENCE NUMERALS

Overview of Figures

FIG. 1, Typical Location of a Transportation Safety Apparatus (TSA) Unit in a Train FIG. 2, TSP System Overview FIG. 3, Cell Phone Transmission Energy Detector FIG. 4, Example of a Remediation Table as part of a Transportation Safety Profile FIG. 5, Biometric ID Authentication Device for "Log-In", Monitoring, and Detection FIGS. 6A & FIG. 6B: obverse (driver's side) & reverse (windshield side) of Safety Apparatus FIGS. 7A & FIG. 7B: show the insertion of an external biometric identification device into a fixed Transportation Safety Apparatus adapted for receiving that device

REFERENCE NUMERALS

FIG. 1, Typical Location of Transportation Safety Apparatus
100 Commuter train or subway with the operator/driver control area in front
102 Operator/Driver cab (e.g., front-most car on a train or subway)
104 Operator seating area (where train or subway is controlled and monitored)
106 Operator and/or Driver control console area
108 Transportation Safety Apparatus mounted in operator control area 106
110 Radio link to supervisory center(s) and/or Transportation Safety System(s)

FIG. 2, TSP System Overview
200 Multiple trains/vehicles linked to Transportation Safety System(s) via satellite
202 Satellite data link including radio links to satellite 202 (or other data sinks/sources)
204 Satellite ground station, e.g., up & downlink to/from Transportation Safety System(s)
206 Computerized train control & database with links to Transportation Safety System(s)
208 Transportation Safety System, with links to fleet(s) & other Transportation System(s)

FIG. 3, Cell Phone Transmission Energy Detector
300 Cell Phone (and/or other wireless electronic device) Detector Equipment
302 Cell Phone (and/or other wireless device) in Driver's/Operator's designated area(s)
304 Antenna to detect the presence of wireless electromagnetic transmissions
306 Circuit to amplify and detect radio signals within all designated frequency bands
308 Circuit to provide and output proportional to the transmission energy detected
310 Adjustable setting to match output when the transmission is within the operator's cab
312 Comparator circuit(s) signal if RF energy detected exceeds Threshold Level(s)
314 Microprocessor Circuit to Perform Table Lookup and Remediation as applicable
316 Radio transmits signal to Transportation Safety System if alert priority warrants FIG. 4, Example of a Remediation Table as Part of a Transportation Safety Profile
No reference numerals needed to describe the event lookup table.

FIG. 5, Version 1, Device for Biometric Identity Authentication (Non-Repudiable "Log-in")
500 Transportation Safety Apparatus (TSA) enclosure containing electronic components
502 Biometric Fingerprint Reader using a "Fingerprint Swipe Sensor" Interface
504 Card Reader using a "Card-Reader swipe interface" (e.g., using a magnetic stripe sensor, contact swipe sensor, proximity card sensor, and/or smartcard reader)
506 Indicator Lights: Shown are 2 Light Emitting Diodes (e.g., one Green, one Red)
508 Mounting Area: Shown are 4 fittings for bolting the device onto console or dashboard FIGS. 6a & 6b: Obverse (Driver's Side) & Reverse (Windshield Side) of Safety Apparatus
600 Case mounted on console or dashboard
602 Fingerprint swipe sensor interface
603 Console or Windshield mount, fingerprint reader inserted (or entire assembly is one-piece)
604 Indicator Lights (shown: 2 LEDs, e.g., red LED and a green LED)
605 View of open device showing main components (device shown with back cover removed)
606 Signals to Indicator Lights
607 Processor w/memory (fingerprint sensing, user profile enforcement); solid state alarm relays (607 may comprise an internal processor and/or may comprise an "onboard-the-auto" processor)
608 Cell phone energy transmission detector circuit; cell phone reporting link (see also FIG. 3)
609 Cell phone detector antenna (also may be used as external cell phone link antenna)
610 Connection to optional fingerprint scanner (shown as 502 on top view of Figure)
611 Attachments for printed circuit board (not shown) on which components are mounted
612 Mounting points to dashboard, windshield attachment or vehicle frame
613 Cable to alarms and engine controls or to vehicle network FIGS. 7A and 7B
701 7A shows Version 2 front side (facing driver)
702 7B shows a USB Fingerprint Identification Device, inserted into USB female interface 703
703 USB female interface for receiving male USB plug from Fingerprint Identification Device
704 Two Indicator Lights (shown are a red and a green LED)
705 7B shows Version 2 with a Fingerprint Identification Device (FID) inserted

DETAILED DESCRIPTION OF THE INVENTION

FIG. 1

Turning now to FIG. 1, a picture of train 100 and the driver and/or operator's engine car 102 (the operator control car) is shown. A car or cab 102 is shown, but any car in the train can serve as a designated control area. Car 102 is generally the duty location of driver and/or operator seating or standing area 104 (operator is not shown). Generally, a duty and control location is in the front-most end of a subway or train (or at the front of a bus, car, truck, etc.). More generally, a control area 104 can be deployed on any vehicle subject to one or more sets of Transportation Safety Policy rules, without defeating purposes of the invention. The actual operator control console and driving controls 106 (not shown) are mechanisms (steering, braking, accelerating, etc.) which the operator uses to control the locomotion of engine car 102. Mounted in control area 104 and console area 106 are one or more Transportation Safety Apparatuses 108, i.e., TSA device(s) 108 (block drawing shown) is mounted on and connected into the controls on console 106. Radio communications link(s) 110 (not shown) carry discrete and/or continuous communications signals to remote and/or local supervisory operators at a Transportation Safety System operations center and/or other TSP enforcement system supervisory center.

FIG. 2

Now referring to FIG. 2, an overview of an entire TSP enforcement system is shown. The system as a whole includes one or more governed and monitored vehicles, each with one or more Transportation Safety Apparatus devices 108 deployed; wired and/or wireless communication links including end-to-end signal processing: here, radio links; a satellite and a ground station; intermediate up and down link equipment; connections to computers with databases comprising Transportation Safety System(s).

The overall TSP enforcement system shown depicts an integrated system of hardware, software, database(s), network resources, etc., in combination adapted to provide an overall "TSP enforcement system". A TSP enforcement system as a whole can be centralized and/or distributed. Such a system can be specified, managed, operated, and enforced by supervisors or managers (systems administrators, owners, etc.) to ensure that authorized vehicle operators are following dictates of predefined TSP spectrum emission policies. A TSP enforcement system can be configured as an autonomous enforcement system and/or as a networked enforcement system which allow oversight control over one or more trains, subways, busses, and/or other vehicles subject to enforcement oversight.

Here, a vehicle of interest—train 200—is shown monitored by means of a satellite communications uplink/downlink circuit(s) on satellite 202. Satellite 202 is further connected wirelessly (or via a combination of wireless and terrestrial circuits) via satellite ground station 204, and via computerized train control computers and circuit interfaces 206, to a Transportation Safety System 208 located at an operations center.

The communications links from the one or more Transportation Safety Apparatuses 108 are conveyed to at least one Transportation Safety System 208 at one or more operations center. The system is fully scalable, from a unitary system (one device 108 at an autonomous vehicle), to a very large system with thousands or more Transportation Safety Apparatuses and dozens of Transportation Safety Systems at multiple operations centers.

At the Transportation Safety System 208's operations center, TSP enforcement system personnel (supervisors, administrators, etc.) are able to receive data from train 200, indicating either train 200's operator compliance or non-compliance with applicable TSP restrictions. At center 208, resides one or more database repositories wherein resides the system-specific TSP spectrum emission policies.

An alarming and reporting circuit reports to center 208 when the installed TSP enforcement device 108 on train 200 detects spectrum emission anomalies emanating from authorized vehicle operators (or anomalies emanated from devices of other persons in the presence of said authorized vehicle operators and the control console) when they are on duty. Each vehicle installation cab site-based apparatus further comprises one or more of a local operator biometric authentication apparatus which also monitors for wireless spectrum emissions emanated from the immediately proximate area where the authenticated vehicle operator is working.

FIG. 3

FIG. 3 depicts an electronic component block diagram, an overview drawing of enabling components of Transportation Safety Apparatus 300, the apparatus of the invention. Here, a cell phone 302 is shown transmitting electromagnetic energy in the proximity of the driver's and/or operator's control area and a deployed Transportation Safety Apparatus 108. The cell phone 302 transmissions are detected and received by device components 300 installed within a deployed Transportation Safety Apparatus 108. Components 300 enables local monitoring and detecting of electromagnetic energy of proximate wireless devices by Apparatus 108. This is the peripheral work of Transportation Safety Apparatus 108 and such is the mission of the overall TSP enforcement system including one or more Transportation Safety Systems and associated operations center. TSA Apparatus 108 using its electronics 300 ultimately reports (via satellite 202, ground station 204, and via a complex of up/downlink equipment 206) to a Transportation Safety System operations center 208 of FIG. 1 (when, as, and if needed, based on details of Transportation Safety Policies chosen for enforcement by the Transportation Safety System of the overall TSP enforcement system).

FIG. 3, component block 300 shows basic high-level functional components (i.e., hardware and software) of the Transportation Safety Apparatus 208, to with:

A biometric authorization subsystem (not shown) including one or more biometric authentication modalities for verifying ID of an operator (e.g., a fingerprint biometric sensor);

Device-front-end antenna 304 for detecting wireless RF transmissions;

Means for detecting cell phone and/or other wireless transmissions and power levels. (cell phone band discriminator 306, cell phone transmission energy detector 308 to detect RF waves from cell phones, texting devices, etc., and variable detection level device 310 for detecting energy levels);

Comparator 312 for comparing detected RF phenomena to known phenomena and/or flagging restricted transmissions to be logged and/or reported via an alarming and reporting interfaces to the center 208;

Various other components and interfaces as needed and/or as custom-configured, to make the apparatus of the TSP enforcement system complete, depending on its complexity, other electronic computers, components, databases, etc., are included as needed; and Microprocessor 314 performs table lookup and initiates alarming and reporting signals as needed, to begin remediation by initiating signals to center 208 when it has been determined that signals must be sent to the center 208.

Microprocessor 314 feeds signals to a radio 316 for communicating data and information to the TSP enforcement system center 208, to inform center 208 of exception conditions or other flag conditions.

Although other biometrics can be used to authenticate authorized operators for driving, the preferred embodiment of the invention is best served by implementing fingerprint biometric authentication of prospective vehicle operators.

After successful authentication of a vehicle operator, several actions take place: First, the RF spectrum emission monitoring and detecting subsystem is actuated. Secondly, a motor- or engine-enabling signal is initiated and starts up the vehicle by means of enabling interface subsystem. Simultaneously, the time of vehicle operator authentication is stored in memory, as part of the day's record of authentication events and detected spectrum emission events.

The monitoring and detecting begins after successful biometric authentication of a vehicle operator. Once the vehicle operator has been authenticated and emission monitoring begins, then the vehicle is enabled, started up, and can operate normally.

Apparatus 300 interfaces with alarming and reporting means that can be connected to center 208, as needed. Also, apparatus 300 stores data in its own memory, in case the connection with the TSP enforcement system fails, or is interrupted and/or a store-and-forward relay is required. Apparatus 300 also includes the vehicle-enabling interface subsystem (not shown). Once authentication is successful, the operator is allowed to start up and operate the vehicle and proceed as required.

FIG. 4

FIG. 4 represents a simple look-up table which compares detected spectrum emission events with TSP requirements and in accordance with dictates of the TSP enforcement system. Parametric specifications of system variables are provided by the system owner, security administrator, fleet manager (i.e., those with policy making and policy enforcing responsibilities). Each system likely differs, depending on the needs and requirements of the system owner(s). Some systems may have the same variable definitions, however, they would most likely be representative of a large homogenous system which implements their governance features equally.

FIG. 5

The FIG. 5 depicts Version 1 of the apparatus of the invention implemented with one preferred enclosure 500. This version is also known as the "Smartcard version" of the invention. This can be implemented with or without a fingerprint swipe sensor, but common practice is to provide for both a smartcard interface and a fingerprint swipe sensor interface.

This Version 1 is implemented with a fingerprint swipe sensor 502 as well as a smartcard reader interface 504.

The instant figure shows integral fingerprint swipe sensor and smartcard insertion interface, however, either or both interfaces are implemented depending on user specifications. The Version 1 of the invention is particularly adapted for dashboard or console mounting, and generally comprises a "permanent" installation.

The Version 1 is adapted for bolting onto the operator's or driver's control machinery area of the governed vehicle. There are also shown indicator lights 506. Here shown are a left and a right side Light Emitting Diode, the left is a green LED, and the right is a red LED. More or fewer LEDs or indicator lights can be implemented as specified. Bolt holes 510 are through-hole apertures which can receive 4 bolts (as shown) for bolting the apparatus 500 onto the dashboard or console, so it is fixed in place and always remains where installed.

FIG. 6A and FIG. 6B

Shown in these figures, is the Version 2 form factor enclosure 600 of the apparatus of the present invention. This version is also known as the Version 2, RFID style, because and RFID interface is implementable as an option in Version 2. This form factor enclosure 600 is typically mounted onto a windshield. Comparing and contrasting, Version 1 and Version 2 perform essentially the same functions. They monitor vehicle activity and operations; detect emissions; log-in operators/drivers; and report to a Transportation Safety System as needed and/or as predetermined. As stated in FIG. 5 above, Version 1 enclosure form factor 500 is adapted to be interfaced either by a fingerprint swipe and/or via smartcard insertion and/or contactless card interface. As shown in FIGS. 6A, 6B, 7A, and 7B, Version 2 is windshield mounted, e.g., via a suction cup interface or by glue-on to the windshield. The Version 2 is generally interfaced with a separately-provisioned external fingerprint identification device (FID) with a fingerprint swipe sensor integral thereto (see also U.S. Pat. No. 7,480,637 to the same inventor, undersigned).

FIG. 6A shows the Version 2 from the front, when an external interface device is plugged into its USB port (RFID and/or biometric identification is used). FIG. 6B shows the Version 2 from the rear, with the back cover removed to reveal the enabling components. There is shown Fingerprint Identification Device (FID) 602, an external device. Device 602 in the instant embodiment, is slid in and inserted into interface dock 603 and the USB female plug interface 603 at the end of dock 603. Indicator lights 604 are shown in a pair of two LEDs, one green and one red in color. Other colors can be used and more or fewer lights can be used. In FIG. 6B, there is shown the reverse side of the device, with the back cover removed. Shown therein is the area where signals are connected into the indicator lights, coming from the processor.

FIGS. 7A and 7B show another picture of Version 2 of the invention, which is also shown separately in FIGS. 6A (FID inserted) and 6b (rear cover removed). This is a Version 2 of the invention which uses an external interface device, a biometric fingerprint sensor aboard the external identification device (see also U.S. Pat. No. 7,480,637 to the same inventor, undersigned). Comparing and contrasting, 6A/6B with 7A/7B: FIG. 7A shows the bare interface 703 for the insertion of an external biometric identification device 702 thereinto. Device 702, an external device, includes an integral swipe sensor. Device 702 allows the driver or operator to authenticate onboard the device 702, instead of on the Version 2 enclosure 701, itself. Depending on the implementation details, the driver or operator will be prompted to authenticate prior to insertion or after insertion, or both. The biggest operational difference between Version 1 and Version 2: Version 1 calls for onboard authentication of the driver/operator, integral to the device. A smartcard may or may not be used in Version 1. Version 2 calls for external authentication of the driver/operator. One thing in common adaptable to Version 1 or Version 2 of the device, is that a contactless interface can indeed be implemented on either, if so specified.

There is no figure provided to illustrate the "Vehicle Operating System" innovation and interface of the present invention. This is a straightforward electrical and/or electromagnetic interface (hardwired and/or radio transmission and reception between the Transportation Safety Apparatus). Notwithstanding, given that virtually all vehicles have a centralized and/or distributed electrical system which operate within the vehicle and in concert with mechanical and/or other systems and subsystems of the vehicle, the innovation of the instant invention is to hardwire and/or wirelessly connect the Transportation Safety Apparatus of the present invention directly into the centralized and/or distributed electrical system(s) of the vehicle (car, engine, subway, bus, train locomotive, airplane, etc.).

Effectively, the primary function of the Transportation Safety Apparatus as relates to the electrical system (aka the Vehicle Operating System or VOS, which includes computerized controls present in most all recent automobiles and other vehicles), is to interrupt and/or interfere or intercede in the operation of the vehicle in the event that the vehicle does not adhere to the requirements and restrictions of the applicable Transportation Safety Policies. For example, a transgressing vehicle (e.g., wherein the vehicle driver is making unauthorized cell phone calls outside of the work routine) could be stopped dead in its tracks, if the Transportation Safety Policies so require: the Vehicle Operating System could literally shut off the vehicle engine's or motor's operation. More likely, the detection of the unauthorized transmission (detected cell spectrum emission event anomalies) will be recorded, logged and/or possibly flagged as urgent risk and sent to the Transportation Safety System which is the governing automation authority implemented by the owners of the system, which executes the instructions provided in the Transportation Safety Policies that apply. The medium of detection is the Transportation Safety Apparatus located in the control area(s) of the vehicle.

Currently, auto or train vehicle operating systems are dominated by "telematics" applications and by "information/entertainment/media" (aka, "infotainment") applications (these appellations seem to originate from Microsoft and other data-oriented companies providing software environments). Such applications also arise from writings, experiments, tests, and implementations of entertainment, information, emergency, and alarm systems offered by traditional US car manufacturers (General Motors, Ford, Chrysler) and from Asian car manufacturers. Development of such systems is well known in the art and is expanding such that electronics-information-media driven environments for automotive applications—including navigation/GPS systems—are becoming commonplace. Other well-known systems for emergency and alarming and communications applications were pioneered by General Motors "OnStar™" and others. The VOS of the current invention is an extension of the concept of vehicle operating systems, to wit: the innovation of the present invention includes the monitoring of predetermined "spectrum emission events/anomalies" which are determined to be loggable and/or reportable to a Transportation Safety System, by means of the apparatus of the invention, the Transportation Safety Apparatus. The monitoring of spectrum emission events and anomalies is to be in accordance with one or more applicable Transportation Safety Policies.

The preceding disclosures were provided as a general overview and one detailed discussion of one of the best modes of the invention. There are many other possible modes of implementing the invention beyond those specifically discussed in this application. These different implementations may use different biometrics other than fingerprint sensors; different microprocessor(s); different foci for detection and reporting; etc. It is assumed that anyone relatively skilled in the art can see the other different way the present invention can be implemented, without departing from the basic theme of the invention.

I claim:

1. A Transportation Safety Apparatus (TSA), comprising an enclosure means for integrating electronic circuits and components, wherein said circuits and components include means for monitoring, detecting, sensing, logging, and reporting wireless transmission events occurring within the proximity of said apparatus and further include means for storing a time-stamped record of detected wireless transmission events and other predetermined detected events.

2. The apparatus of claim 1, additionally comprising at least one means for ensuring identification, authentication, authorization, and non-repudiation of "on-duty" login by at least one of a driver and a vehicle operator wherein said at least one means further comprises at least one of a biometric device a non-biometric identification device.

3. The apparatus of claim 2, wherein said biometric identification device comprises at least one from the group of a fingerprint sensor, a hand geometry sensor, a retina sensor, an iris sensor, a face recognition sensor, a heartbeat sensor, a breathalyzer sensor, and a voiceprint.

4. The apparatus of claim 1, further comprising means to verify continuous compliance with at least one predetermined Transportation Safety Policy (TSP) in the immediate proximity of at least one of an identified "logged-in" driver and a vehicle operator.

5. The apparatus of claim 4, further comprising transceiver transmitting and receiving at least one of (1) a stored time-stamped record of at least one detected wireless transmission event; (2) detected violations of restrictions of said Transportation Safety Policy (TSP); (3) exception data; and (4) other predetermined operational data and control information to at least one Transportation Safety System (TSS).

6. The apparatus of claim 5, wherein said transceiver transmits real-time data and/or stored data including: fuel level, consumption rate, and time to empty; geographic location; engine data including engine temperature, voltage, current, maintenance level, battery charge; operational data including speed, acceleration, deceleration, braking, underway time, start/stop time, doors open/closed, climate control status; and other control data including identified, authenticated, and authorized driver(s) and vehicle operator(s) "log-In" and "log-out" data.

7. The apparatus of claim 5, wherein said transceiver transmits and receives control information between said apparatus and said at least one Transportation Safety System.

8. The apparatus of claim 5 further including means for transmitting said record as a prioritized alarm record to at least one said Transportation Safety System (TSS) in accordance with said at least one Transportation Safety Policy (TSP).

9. The apparatus of claim 1, further including enabling means to enable operation and start-up of said vehicle after said at least one of a driver and a vehicle operator has been identified, authenticated, authorized, and logged-in.

10. The apparatus of claim 9, wherein said means to enable operation and start-up further comprises an enablement control circuit to permit said at least one of an authorized driver and vehicle operator to start up and operate said vehicle and wherein said means to enable further includes means for interfacing at least one vehicle operating system.

11. The apparatus of claim 5, further including means for counting and logging the count of unauthorized detected wireless communication spectrum emission events emitted from cell phones, portable computing devices, and other predetermined electronic devices.

12. The apparatus of claim 11, further including means to count and log said wireless events occurring within a predetermined proximity of driver and operator control areas.

13. The apparatus of claim 12, also adapted to count and log emissions from the group of a predefined set of frequencies/frequency ranges, emitted above or below predefined power levels; and emitted between predetermined time intervals.

14. The apparatus of claim 11, wherein said counting and logging means are further adapted to detect gaseous vapors including alcohol vapors and other predefined vapors detected within a predefined vicinity of said driver and vehicle operator control areas.

15. The apparatus of claim 1, further comprising at least one component and circuit from the group of a microprocessor; a microprocessor circuit with a non-volatile storage component; an RF emission detection circuit; at least one sensor means for sensing presence of: predetermined chemicals, gaseous vapors, predetermined temperature thresholds, illegal and/or controlled substances including smoke from marijuana, hashish, and cocaine; radio wave detection and processing means including an antenna, a transceiver including an amplifier, a receiver, a transmitter, a signal intelligence processor; a data event counter circuit including an accumulator, a buffer, a register, and a non-volatile memory for storing and retrieving data from an event database; and at least one general-purpose processor including an input/output interface including a communication interface and an enablement circuit interface for enabling a controlled target device including at least one from the group of an engine, a motor, a transceiver, a power source, and a vehicle operating system.

16. The apparatus of claim 11, wherein counted events comprise at least one of real-time count data and stored count data recorded in non-volatile memory and further includes said spectrum emission events, and other predetermined wireless and non-wireless events occurring throughout the entire time period that said at least one of a driver and a vehicle operator is logged-in as "on duty".

17. The apparatus of claim 1, wherein said means are further adapted to detect, log, store, and report the presence of predetermined violations of at least one Transportation Safety Policy by all proximate operating electronics devices to a Transportation safety System (TSS) and wherein said apparatus further includes enforcement, management, and remediation means to enforce Transportation Safety Policies (TSP) by taking predetermined affirmative management and remediation actions in response to the severity of said violations.

18. The apparatus of claim 17, further adapted to report to said Transportation Safety System (TSS) only when said devices are transmitting and receiving signals not in accordance with applicable Transportation Safety Policies (TSP).

19. The apparatus of claim 17, wherein said enforcement, management, and remediation means and predetermined affirmative management and remediation actions include forcing an automatic vehicle stop when a predetermined number of predefined conditions occur and/or when the severity of said violations exceeds a predetermined threshold or a sufficiently server alarm occurs.

20. A method for ensuring compliance with Transportation Safety Policies (TSP) by a vehicle operator, comprising the steps of:
　a. promulgating and establishing at least one Transportation Safety Policy (TSP);
　b. providing, programming, and operating a Transportation Safety System (TSS) including means for controlling affirmative management and remediation actions in response to TSP violations and predetermined alarms therefrom; and
　c. providing, programming, issuing, and operating at least one Transportation Safety Apparatus (TSA) for at least one of (1) identifying, authenticating, and authorizing said at least one of driver and an operator; (2) monitoring, detecting, and logging driver and operator violations of said TSP; (3) alarming, reporting, and communicating said violations to said TSS.

21. The method of claim 20, wherein said step of promulgating and establishing said at least one Transportation Safety Policy (TSP) is executed by at least one from the group of a system administrator, technician, operator, and a system owner.

22. The method of claim 21, wherein said step of promulgating and establishing said at least one Transportation Safety Policy is based on at least one prerequisite predetermined definition of specific rules, policies, restrictions, and violations that apply to said TSP.

23. The method of claim 22, wherein said at least one Transportation Safety Policy (TSP) includes restrictions on unauthorized wireless spectrum emission events by said at least one of a driver and a vehicle operator.

24. The method of claim 20, wherein the step of providing, programming, and operating said Transportation Safety System (TSS) includes sub-steps of integrating hardware, software, storage, and processor resources; providing at least one of a wire-connected and a wireless communication resource; programming into said TSS at least one governing Transportation Safety Policy (TSP) parameter defining said restrictions, violations, and alarms thereof; communicating between said at least one Transportation Safety Apparatus (TSA) and said at least one TSS; and bringing online and operating said TSS in combination with at least one TSA.

25. A Transportation Safety System (TSS) for ensuring compliance with applicable governing Transportation Safety Policies (TSP), comprising:
　a. at least one promulgated and established governing TSP;
　b. at least one of a wireless and a wire-connected communication resource for communicating to at least one said TSS and at least one Transportation Safety Apparatus (TSA) deployed aboard a TSP-governed vehicle operated by at least one of a "logged-in" operator and driver;
　c. said at least one TSP-governed vehicle communicating with said TSS; and
　d. said at least one Transportation Safety Apparatus communicating at least one TSS in accordance with said at least one governing TSP.

26. The Transportation Safety System (TSS) of claim 25, further adapted to operate in accordance with said at least one governing TSP determining operation, management, enforcement, and remediation actions of said TSS based on at least one from the group of time of day; operational status of said at least one TSP-governed vehicle; and the identity of said vehicle operator operating said TSP-governed vehicle.

27. The system of claim 26, wherein said at least one governing TSP governs operation of said TSS based on predetermined events including alarmed and unalarmed events.

28. The system of claim 27, wherein said events include at least one alert or alarm priority affecting communication periodicity between said at least one TSA to at least one TSS.

29. The system of claim 25, wherein said at feast one of a wireless and a wire-connected communication resource is further adapted to communicate with at least one TSS in accordance with at least one governing TSP.

30. The system of claim 25, wherein said Transportation Safety System (TSS) is further adapted for communicating with one or more additional TSSs.

31. The system of claim 30, wherein said TSS is optionally adapted for connection to and communication with at least one predefined external (non-TSS) system.

32. The system of claim 31, wherein said Transportation Safety System (TSS) is adapted for communication with said at least one external (non-TSS) system including at least one from the group of (but is not limited to) a police system, a fire department system, and at least one of a private and a public security system.

33. The Transportation Safety System (TSS) of claim 25, wherein said TSS and said TSA are further adapted for reporting the operational status of said at least one TSA and said TSP-governed vehicle based on at least one of whether said TSP-governed vehicle is (1) logged into said TSS as operational; (2) not logged into said TSS as operational; (3) logged in as underway, not making way; (4) logged in as underway, making way; and (5) determined as suddenly stopped with or without a reported alarm.

34. The apparatus of claim 1, also adapted for monitoring, detecting, sensing, logging and reporting presence of gaseous vapors to at least one of a Transportation Safety System and an external (non-TSS) system according to applicable Transportation Safety Policies.

35. The apparatus of claim 1, further adapted for monitoring, detecting, sensing, logging, and reporting to a Transportation Safety System, the presence or absence of Bluetooth wireless frequencies whenever a proximate cell phone transceiver is transmitting or receiving wireless transmissions to and from a cell phone tower antenna, said logging and reporting occurring as predefined in at least one Transportation Safety Policy.

36. The apparatus of claim 35, wherein said device is further adapted for monitoring, detecting, sensing, logging and reporting the presence or absence of Bluetooth wireless frequencies whenever any other wireless transmissions are simultaneously present.

37. The apparatus of claim 2, wherein said at least one means for ensuring identification, authentication, authorization, and non-repudiation is not integral to said apparatus.

38. The apparatus of claim 37, wherein said at least one identity ensuring means not integral to said Transportation Safety Apparatus is individually-provided [by said at least one of a driver or vehicle operator] at time of "on-duty" log-in and "off-duty" log-out.

39. The apparatus of claim 38, wherein said identity ensuring means not integral to said apparatus is at least one of physically and wirelessly coupled to said apparatus.

40. The apparatus of claim 2, wherein said means for ensuring identification, authentication, authorization, and non-repudiation is integral to said apparatus.

41. The apparatus of claim 40, wherein said identity ensuring means is insertable and removably-attachable to said Transportation Safety Apparatus and comprises at least one of a smartcard and a fingerprint identification device.

42. The apparatus of claim 40, wherein said identity ensuring means comprising at least one insertable and removably-attachable device includes a biometric fingerprint reader.

43. A Transportation Safety Apparatus (version 2) adapted for interfacing with at least one externally-provided means for ensuring identification of at least one of a driver and an operator, wherein said Transportation Safety Apparatus further comprises an enclosure means for integrating electronic circuits and components, wherein said circuits and components include means for monitoring, detecting, sensing, fogging, and reporting wireless transmission events occurring within the proximity of said apparatus and further include means for storing a time-stamped record of detected wireless transmission events and other predetermined detected events.

44. The Transportation Safety Apparatus of claim 43, further adapted to interface with at least one of a wireless proximity card, a removably-insertable fingerprint identification device, and a removably-insertable smartcard device.

45. The Transportation Safety Apparatus of claim 43, further including at least one female fitting adapted to receive at least one of a USB male plug and a smartcard insertion from a removably-insertable device comprising at least one of a fingerprint identification device and a smartcard device.

46. The apparatus of claim 44, further adapted to receive wireless signals from at least one of (1) said wireless proximity card (with or without a biometric sensor) having a contactless transceiver for communicating with said apparatus; (2) said removably-insertable fingerprint identification device (with or without a biometric sensor) having a contactless transceiver for communicating with said apparatus; and (3) a contactless smartcard (with or without a biometric sensor) having transceiver for communicating with said apparatus.

47. A vehicle operating system (VOS) adapted for interfacing at least one of a Transportation Safety Apparatus (TSA) and a Transportation Safety System (TSS) and further adapted to implement and enforce restrictions and requirements of at least one applicable and governing Transportation Safety Policy (TSP), wherein said restrictions and requirements being implemented and enforced are comprehensively stated in advance in accordance with the transportation safety specifications of said TSP as defined by systems and security management and by TSP governing management.

48. The vehicle operating system (VOS) of claim 47, further comprising hardware including at least one general purpose processor executing at least one control program including instructions for implementing and enforcing requirements of said at least one Transportation Safety Policy (TSP) and for providing at least one physical hardware port means for interconnecting at least one of a wire-connected and a wireless input/output/control interface line into said VOS.

49. The vehicle operating system (VOS) of claim 47, additionally comprising at least one of a wire-connected and a wireless input/output/control interface line connected between at least one of a Transportation Safety Apparatus (TSA) and a Transportation Safety System (TSS) and said vehicle operating system (VOS) by means of said at least one physical hardware port means for access thereto.

50. The vehicle operating system (VOS) of claim 47, further adapted to interface at least one predefined vehicle subsystem from the group of a telematics subsystem(s), an "information/entertainment" subsystem(s), an electrical subsystem(s), a mechanical subsystem(s), an emergency subsystem(s), and a computer subsystem(s) including at least one of a processing subsystem(s), a logical subsystem(s), and an artificial intelligence system.

* * * * *